United States Patent [19]
Hansen et al.

[11] 4,432,710
[45] Feb. 21, 1984

[54] ROTARY TYPE MACHINE WITH CHECK VALVES FOR RELIEVING INTERNAL PRESSURES

[75] Inventors: Christian B. Hansen, Nordborg; Carl O. Flagstad, Sonderborg, both of Denmark

[73] Assignee: Danfoss A/S, Nordborg, Denmark

[21] Appl. No.: 363,901

[22] Filed: Mar. 29, 1982

Related U.S. Application Data

[63] Continuation of Ser. No. 132,306, Mar. 20, 1980, abandoned.

[30] Foreign Application Priority Data

Mar. 20, 1979 [DE] Fed. Rep. of Germany ....... 2910831

[51] Int. Cl.³ .......................... F03C 2/22; F04C 2/22; F04C 15/00; F16K 15/14
[52] U.S. Cl. ................................. 418/61 B; 137/860
[58] Field of Search ............. 418/61 B, 102; 137/860; 251/DIG. 1

[56] References Cited
U.S. PATENT DOCUMENTS

| | | | |
|---|---|---|---|
| 3,547,564 | 12/1970 | Charlson | 418/61 B |
| 3,802,012 | 4/1974 | Middleton, Jr. | 137/860 |
| 3,862,814 | 1/1975 | Swedberg | 418/102 |
| 4,087,215 | 5/1978 | Miller | 418/61 B |
| 4,362,479 | 12/1982 | Pahl | 418/102 |

*Primary Examiner*—John J. Vrablik
*Attorney, Agent, or Firm*—Wayne B. Easton

[57] ABSTRACT

The invention relates to a hydraulic pump or motor having expansible chamber section at one end thereof, which may be a gerator gear set, and a drive shaft at the other end thereof. A distributor valve having a central bore directs fluid between inlet and outlet ports in the housing and the expansible chamber section. The leakage of pressurized fluid into the central bore of the valve causes certain problems including the problem of directly or indirectly causing destructive forces to be applied to the seal provided between the drive shaft and the housing. This problem is addressed by providing check valve arrangements in the housing between the central bore of the valve and the inlet and outlet ports. The check valves open in the direction of the inlet and outlet ports so that when fluid pressure in the valve bore exceeds the fluid pressure in either of the ports, the pressure in the bore is lowered by fluid being forced outwardly through the port having the lower pressure.

1 Claim, 3 Drawing Figures

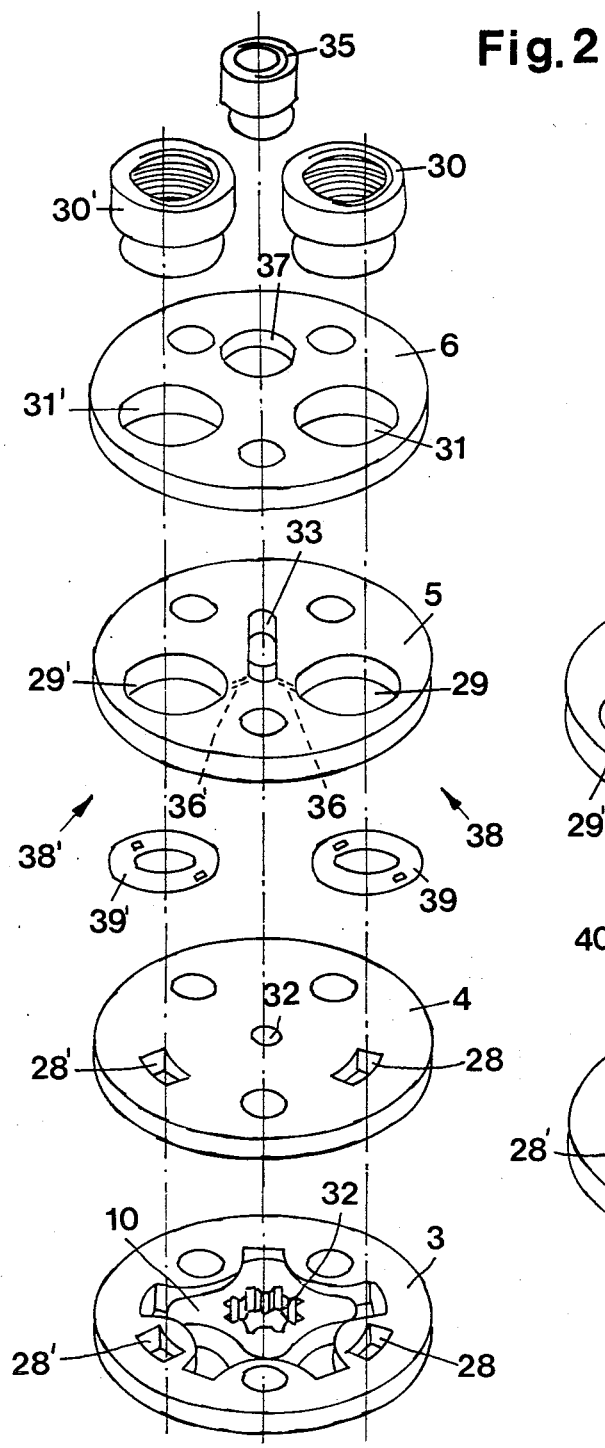
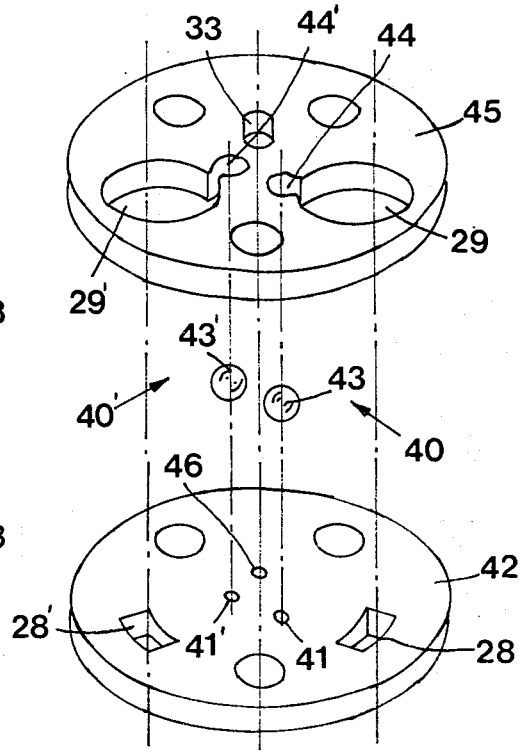
Fig. 2
Fig. 3

ROTARY TYPE MACHINE WITH CHECK VALVES FOR RELIEVING INTERNAL PRESSURES

This application is a continuation of application Ser. No. 132,306, filed Mar. 20, 1980, now abandoned.

The invention relates to an internally shafted hydraulic planetary piston machine with mating engagement, particularly a motor, comprising a housing, a main shaft which passes through an end bore in the housing and is there sealed by a seal held in an annular groove, a rotary valve sleeve which is fixed to the main shaft and connected to the rotor disposed at its other end by a cardan shaft, forms a distributor valve together with a bore in the housing, has a shoulder abutting an axial bearing on the side adjacent the seal, and the interior of which is connected to the axial bearing by at least one bore, and two passages of which one is intended for a higher pressure and the other for a lower pressure.

In known planetary piston machines of this kind (DE-AS No. 12 59 000), the problem arises that hydraulic fluid assumes a higher pressure in the region of the axial bearing and thereby presses the seal into the gap between the main shaft and housing. This first exerts a wedging action on the main shaft resulting in increased friction and finally leads to destruction of the seal. Such a rising pressure occurs, for example, if the axial bearing in the distributor valve is adjacent an annular groove containing hydraulic fluid at elevated pressure. It also occurs if hydraulic fluid at elevated pressure flows from the compression chambers between the rotor and stator or by way of leakage passages on the distributor valve into the interior of the rotary valve sleeve and then through the connecting bore into the region of the axial bearing.

The invention is based on the problem of providing a planetary piston machine of the aforementioned kind in which, irrespective of the direction of rotation, the main shaft seal is not excessively loaded.

This problem is solved according to the invention by two check valves which are interposed between the interior and a respective one of the two passages and open away from the interior.

In this construction, one of the check valves will always open as soon as the pressure in the interior of the rotary valve sleeve exceeds that in the passage having a lower pressure or, if the check valve is prestressed, if the pressure difference overcomes the prestress. This ensures that the main shaft seal is not subjected to excessive loads, does not exert excessive clamping action on the main shaft and has a long life. It is immaterial whether the planetary piston machine turns left or right or is operated to alternate in both directions because the one check valve will always establish a connection to the passage at lower pressure and the other check valve blocks the connection to the passage at higher pressure. The expense of the two check valve is very low. Since the interior of the rotary valve sleeve is automatically connected to the passage at lower pressure, it is sufficient to connect the planetary piston machine in conventional manner by way of two operating conduits to a control device or to the pump and tank.

In a preferred embodiment, the check valve is provided in a housing cover portion disposed on that side of the rotor and stator which is remote from the rotary valve sleeve. In this case the interior is connected by way of an aperture in the rotor and the two passages by way of an aperture in the stator to valve connecting passage portions in said cover portion. The check valve or check valves are therefore disposed in a housing portion which lies outside the rotating part of the machine.

It is in this case particularly favourable if the end of the cover portion carries connectors for a supply conduit and a discharge conduit. This not only results in a housing of comparatively small cross-section but the check valves can be directly connected to the associated passages.

A construction is advisable in which each check valve comprises an O ring which lies against housing portions at the circumference and both sides and is traversed by the valve connecting passage portion on the supply and discharge side respectively, and wherein a connecting groove opens into the circumferential wall that extends from the valve connecting passage portion on the side of the interior. Such an O ring is pressed away from the associated walls when a higher pressure occurs in the connecting groove. However, it reliably seals the groove orifice when the pressure is higher at the inner side of the O ring.

It is advisable for the cover portion of the housing to comprise a valve plate which is disposed between an intermediate plate abutting the rotor and stator and an end plate carrying the connectors and which comprises the valve connecting passage portions in the form of two through-holes for receiving a respective O ring and an aperture, for the aperture to be connected to both through-holes by way of grooves extending along one end face of the valve plate, and for the O rings each to be held against the intermediate plate by a respective one of the connectors.

Another preferred embodiment provides that each check valve is a ball valve of which the seat is formed in an intermediate plate abutting the rotor and stator by an axial bore disposed in a zone swept by the aperture in the rotor, and of which the ball is mounted in an axial guide of a valve plate adjacent the intermediate plate, the guide being laterally connected to one valve passage connecting portion. This permits the very economic incorporation of check valves in which no return forces have to be overcome.

The invention will now be described in more detail with reference to an example illustrated in the drawing, wherein:

FIG. 2 is an exploded view of the right-hand part of the FIG. 1 machine, and

FIG. 3 is a partial view similar to FIG. 2 of a modified embodiment.

Figure 1:
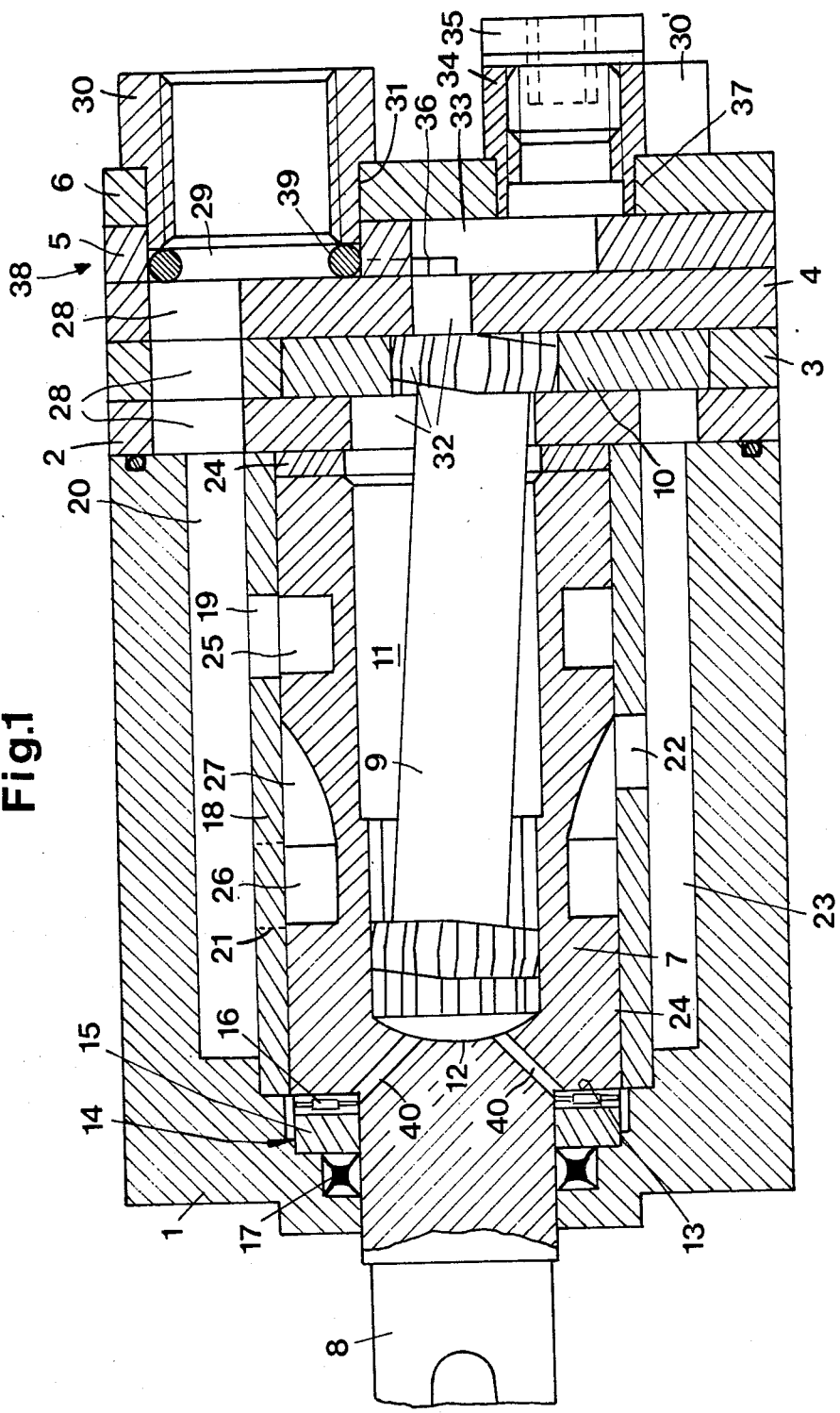
FIG. 1 is a longitudinal section through a planetary piston machine according to the invention.

The housing of the planetary piston machine shown in FIG. 1 comprises a cup-shaped main portion 1, an intermediate plate 2, a stator 3 in the form of a gear ring, a further intermediate plate 4, a valve plate 5, and an end plate 6 securely interconnected by bolts (not shown). A rotary valve sleeve 7 is made in one piece with a main shaft 8 and connected by way of a cardan shaft 9 to a rotor 10 in the form of a gear. The rotary valve sleeve has an interior 11 closed at one side by a wall 12. It also comprises a shoulder 13 abutting an axial bearing 14 which consists of a bearing plate 15 and a roller bearing 16. The bearing plate 15 also bounds a groove containing a main shaft seal 17.

The inside of the main portion 1 is provided with a sleeve 18 providing an inlet aperture 19 communicating with a supply passage 20, a discharge aperture 21 communicating with a discharge passage disposed beyond the plane of the drawing, and, therebetween, control apertures 22 which communicate with control passages 23. The control passages lead to the compression chambers which are formed between the teeth of the rotor and stator. This sleeve 18 forms a distributor valve together with the rotary valve sleeve 7. The rotary valve sleeve is supported by a bearing plate 24 of the intermediate plate 2 and has a supply ring groove 25 and a discharge ring groove 26 which are alternately connected to axial distributor grooves 27.

The supply passage 20 is connected to a connector 30 by way of apertures 28 in the intermediate plates 2, 4 and the stator 3 and a valve connecting passage portion 29 in the form of a bore in the valve plate 5. The connector 30 engages through a bore 31 in the end plate 6 and projects into the valve connecting passage portion 29. Similarly, the discharge passage (not shown) is connected to a connector 30' by way of apertures 28' and a valve connecting passage portion 29' in the form of a bore, the connector 30' engaging in a bore 31' and in the valve connecting passage portion 29'. The interior 11 is connected to an aperture 33 in the valve plate by way of aperture 32 in the intermediate plates 2 and 4 as well as the rotor 10. The aperture 33 communicates on the one hand with a discharge connector 34 which is closed by a screw 35 and on the other hand with the circumference of the valve connecting passage portions 29, 29' by way of grooves 36, 36'. The connector 34 engages in a bore 37 of the end plate 6.

Two check valves 38 and 38' are formed in that each valve connecting passage portion 29 and 29' contains an O ring 39, 39' which abuts the circumference of the associated valve passage connecting portion and is held against the intermediate plate 4 by the end of the connector 30 or 30', respectively.

In addition, the rotary valve sleeve 7 is provided with two bores 40 which connect the interior 11 to the shoulder 13 and in this way bring about a pressure balance between the axial bearing 14 and the interior 11.

Assuming that the planetary piston machine of FIGS. 1 and 2 operates as a motor and the connector 30 serves as a supply connector, the supply passage 20 will then be at a higher pressure. The check valve 38 is securely closed because this pressure pushes the O ring 39 tightly against the abutment faces. Pressure fluid at lower pressure is discharged through the discharge passage connected to the annular groove 26 and through the connector 30'. If leakage losses set up a higher pressure in the interior 11 that would exert a force towards the axial bearing 14, then the check valve 38' opens. This is because this pressure acts through the associated groove 36' on the outside of the O ring 39' so that the latter is lifted from one of the end abutment faces and brings about pressure equalisation. If the direction of rotation of the planetary piston machine functioning as a motor is reversed, then the same conditions apply but the check valve 38' will then function as a blocking valve and the check valve 39 as an equalisation valve. Similar conditions will also arise when the machine is operated as a pump.

In the FIG. 3 modification, only the intermediate plate 42 (corresponding to the intermediate plate 4) and the valve plate 45 (corresponding to the valve plate 5) are shown. Two check valves 40 and 40' are provided which are in the form of a ball valve. The seat is formed by axial bores 41 and 41' in the intermediate plate 42. The valve members are formed by balls 43 and 43' held in guides 44 and 44' which communicate laterally with the valve connecting passage portion in the valve plate 45. A third axial bore 46 in the intermediate plate 42 corresponds to the aperture 43 which leads to the discharge connector 34.

If, for example, the valve connecting passage portion 29 is at a higher pressure, the associated check valve 40 is closed. If the pressure in the interior 11 rises to above the discharge pressure in the valve connecting passage portion 29', the ball 43' is lifted off the seat 41' so that the check valve 40' opens.

What is claimed:

1. A hydraulic pump or motor, comprising, a housing defining a central bore and an inlet and outlet passage means, said housing having axially oriented inlet and outlet ports at one end thereof having respective fluid communication with said passage means, expansible chamber means at said one end of said housing and drive shaft means rotatably supported at the other end of said housing, annularly shaped valve means rotatably mounted in said housing bore and forming an inner bore, said drive shaft means being connected to said valve means, drive means in said valve means inner bore connecting said valve means to said expansible chamber means, said housing having an end part surrounding said drive shaft means, an annular bearing plate surrounding said drive shaft means, said plate engaging said housing end part and forming therewith an annular groove surrounding said drive shaft means, an annularly shaped shaft seal in said groove, said valve means having a shoulder part adjacent said bearing plate, bearing means between said valve means shoulder part and said bearing plate, said housing being formed in part with a circular plate section adjacent said one end thereof, said circular plate section having an aperture in fluid communication with said housing central bore and first and second bores forming portions of said housing inlet and outlet passage means, first and second passages between said aperture and said first and second bores, first and second O-rings in said first and second bores forming first and second check valve means between said valve means inner bore and said inlet and outlet ports which are respectively openable in the direction of said ports to limit the magnitude of fluid pressure in said inner bore and thereby limit the magnitude of forces applied to said bearing means, said bearing plate and said shaft seal.

* * * * *